July 15, 1924.

F. W. HANLEY

ANTISKID DEVICE

Filed March 2, 1923

F. W. Hanley
INVENTOR

BY Victor J. Evans
ATTORNEY

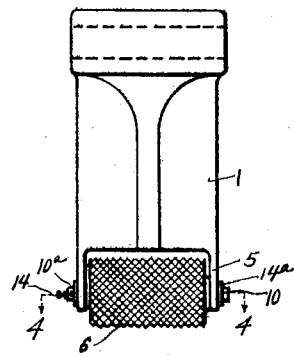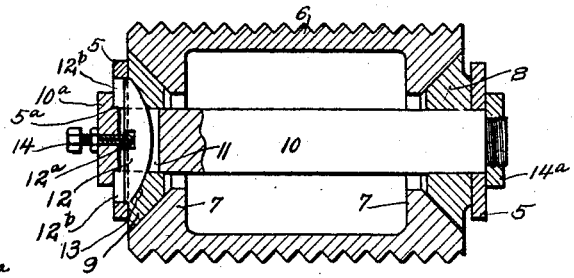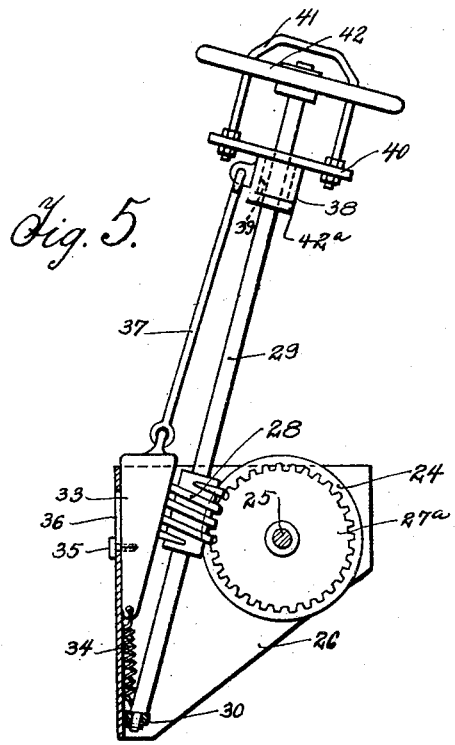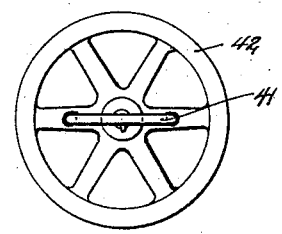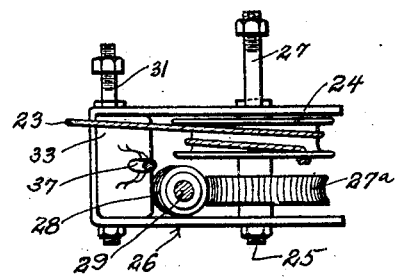

Patented July 15, 1924.

1,501,771

UNITED STATES PATENT OFFICE.

FRANK W. HANLEY, OF PITTSBURGH, PENNSYLVANIA.

ANTISKID DEVICE.

Application filed March 2, 1923. Serial No. 622,404.

*To all whom it may concern:*

Be it known that I, FRANK W. HANLEY, a citizen of the United States, residing at Pittsburgh, in the county of Allegheny and State of Pennsylvania, have invented new and useful Improvements in Antiskid Devices, of which the following is a specification.

This invention relates to anti-skid devices, and more particularly to anti-skid devices specially adapted for use in connection with automobiles.

One of the main objects of the invention is to provide a device of the character stated of simple construction and operation which may be applied to automobiles of standard construction and will effectually prevent skidding. A further object is to provide a device which will act to hold the rear wheels of the automobile tightly in contact with the traction surface so as to effectually grip the same thus preventing slipping or skidding of the rear wheels. Further objects will appear from the detailed description.

In the drawings:

Figure 3 is a rear view of one of the supporting arms and associated parts;

Figure 4 is a section through one of the rollers and associated parts;

Figure 5 is a detail, partly in section, of the winding drum and associated parts;

Figure 6 is a top plan view of the hand wheel and associated parts for controlling the winding drum;

Figure 7 is a top plan view of the winding drum and associated parts.

Figure 1:
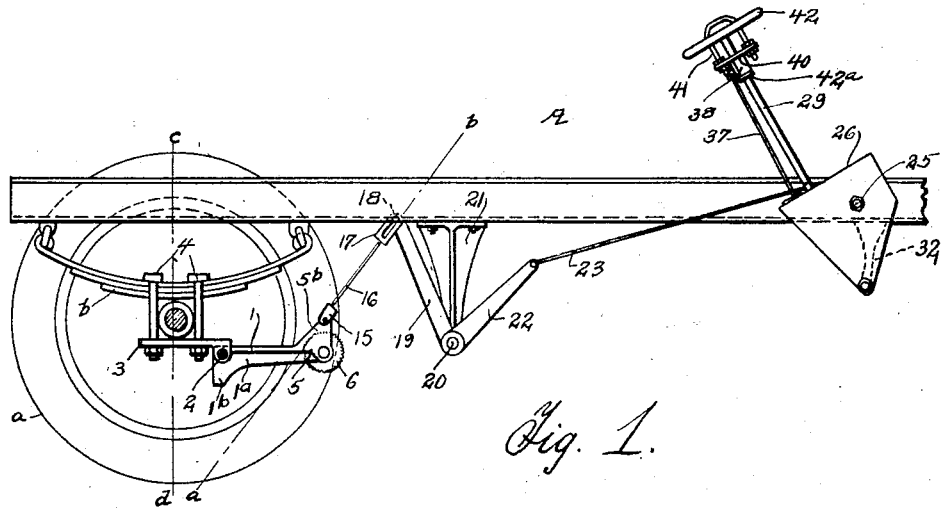
Figure 1 is a side view of the device as applied.
Figure 2:
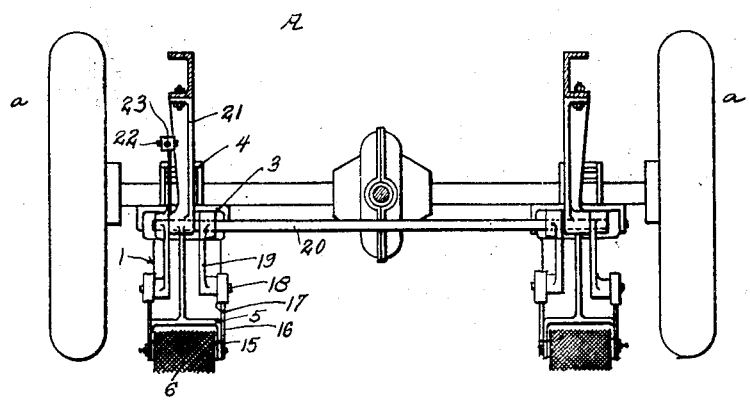
Figure 2 is a front view.

This invention is intended more particularly as an improvement over the device disclosed in my U. S. Patent 1,439,548, the primary object being to so mount and arrange the device on the automobile that, during travel of the automobile, downward pressure is exerted on the rear wheels so as to hold the same pressed firmly against the traction surface. The device includes supporting arms 1 of suitable construction positioned adjacent to the rear wheels *a* of the automobile A. Each of these arms is pivotally secured at its rearward end, at 2, to a plate 3 which is secured by U-bolts 4, or in any other suitable or preferred manner, to rear springs *b* of the automobile, the plate being positioned beneath the rear axle housing. Arm 1 is provided, at its lower end, with a rectangular frame 5 which is adapted for reception of a hollow roller or cylinder 6 the outer surface of which is knurled to provide an effective gripping surface. This roller is provided, adjacent to each end, with an inner, friction collar 7, these collars being adapted for contact with friction cones 8 and 9 fitting into the collars 7. Cones 8 and 9 are mounted upon a shaft 10 of squared cross-section which is inserted through the ends of frame 5. This shaft is provided, adjacent to one end, with a diametrically extending slot 11 which receives a key 12 shaped to fit into a corresponding groove 13 in the outer face of cone 9. A set screw 14 is threaded into shaft 10 from head 10ª thereof, the end of this screw fitting into a central recess 12ª in the outer face of key 12. By turning screw 14 into shaft 10 pressure is exerted on key 12 so as to force cone 9 into tight contact with the adjacent collar 7 forcing the roller 6 toward cone 8 so as to cause the collar 7 adjacent to this cone to contact therewith. This provides simple and efficient means whereby the frictional engagement between the cones, which are held against rotation on the squared shaft 10, and the collars 7 may be adjusted to offer the desired resistance to rotation of roller 6. To accommodate key 12 one end of frame 5 is provided with recesses 12ᵇ which extend from squared opening 5ª for accommodating the shaft. A suitable nut 14ª is threaded on the other end of shaft 10 at the outer face of the other end of frame 5 and serves, in conjunction with head 10ª, to hold the shaft against longitudinal movement.

Frame 5 is provided, at each end, with a forwardly extending lug 5ᵇ to which is pivotally secured a plate 15 from which extends a rod 16 secured, at its upper end, to a slotted head 17. Head 17 receives rectangularly disposed fingers 18 provided at the upper ends of adjusting arms 19 secured on a shaft 20 rockably mounted transversely of the automobile in brackets 21 secured to the automobile chassis. An operating arm 22 is secured to shaft 20 and projects forwardly therefrom. This arm is connected, at its upper end, by a cable 23 to a drum 24 mounted upon a stub-shaft 25 extending through a casing 26. This stub-shaft projects beyond the casing to provide a securing element 27 which is secured through one of the sills of the chassis of the automobile. A worm wheel 27ª is secured to drum 24 at one side thereof and is adapted to mesh with a worm 28 carried by a shaft 29 which is rotatably mounted, at its lower end, in a plate 30 rockably mounted in casing 26 for movement about an axis parallel with the axis of stub-shaft 25. Plate 30 is provided with an extension forming a securing element 31 which is secured through a bracket 32 secured to the chassis sill. A wedge 33 is slidably mounted in casing 26 and is normally held in its inner or operative position by means of a tension spring 34 secured to the wedge and to the casing. This wedge is positioned to hold shaft 29 in position with worm 28 in mesh with worm wheel 27ª, when in lowered or operative position, as illustrated. A headed pin 35 is secured in the under face of wedge 33 and operates through a slot 36 in the casing, this pin serving to prevent complete withdrawal of the wedge from the casing and also preventing downward movement of the wedge to such an extent as to cause binding of the worm.

A release rod 37 is secured at its lower end to the upper end of wedge 33. This rod is secured at its upper end to an outer sleeve 38 which is mounted about an inner sleeve 39 depending from a plate 40 supported by a U-bolt 41 the arms of which pass between the spokes of a hand-wheel 42 secured on the upper end of shaft 29. Sleeve 39 is provided, at its lower end, with an outer annular flange 42ª which serves to prevent downward movement of sleeve 38, this outer sleeve being confined between flange 42ª and plate 40. This provides simple and efficient means whereby the wedge 33 may be raised, when desired, and free rotation of wheel 42 and shaft 29 is permitted. With the wedge 33 in its lowered or operative position, by rotating shaft 29 drum 24 is rotated so as to wind cable 23 onto the arm thus rocking shaft 20, through arm 22, in such direction as to raise the arms 19 and the parts associated therewith. The worm and worm wheel provide efficient means for locking shaft 20 and the parts associated therewith in adjustment. With the arms 1 raised, during travel of the vehicle the forward ends of arms 1 have limited vertical movement imparted to them so that the heads 17, on downward movement of arms 1, strike the fingers 18 of arms 19. This produces a series of blows which are struck during travel of the automobile, the force of these blows being transmitted along the line $a$—$b$ (Figure 1). This line intersects the traction surface slightly in advance of the vertical plane which passes through the axis of the rear wheels of the automobile, indicated by the line $c$—$d$. These downward blows occur simultaneously with the downward movements of the vehicle body and serve to provide additional downward pressure which is applied to the rear wheels of the automobile slightly in advance of the point of contact thereof with the traction surface, this additional downward pressure on the wheels serving to force the same tightly against the traction surface so as to effectually grip the same thus eliminating possibility of slipping or skidding. Just exactly how the device operates in this manner is not perfectly clear, though it has been proved by repeated tests that, with the parts in the positions illustrated in Figure 1 the automobile will not skid even on damp and slippery traction surfaces whereas the same automobile will skid on such surfaces if the device is removed. Just why the device acts to prevent skidding is not absolutely clear and while the above statement of the operation of the device is believed to be correct I cannot be absolutely certain if this is so. I have ascertained, by extensive experiments, that there is a definite relation between the line along which the downward blows struck by the arms 1 act and the vertical plane which passes through the axis of the rear axles of the automobile, and it appears that the best results can be obtained by having the parts related in the manner illustrated and described.

In the event that it is necessary to stop the automobile within a short distance to prevent a collision, or for any other reason, the wedge 33 is withdrawn so as to permit movement of shaft 29 away from worm wheel 27. This disengages worm 28 from the wheel thus releasing the wheel and the drum which turns freely on stub-shaft 25 in cable-unwinding direction thus permitting arms 1 to drop so as to bring the rollers 6 into contact with the traction surface. The distance from the upper end of arm 1 to the lowermost point of the roller 6 is greater than the normal distance between the rear axle housing and the traction surface so that, when the arms are dropped, rollers 6 contact with the traction surface and, due to frictional contact between cones 8 and 9 and collars 7, exert an initial braking effect, after which the arms are swung rearwardly into vertical position so as to lift the rear wheels of the automobile out of contact with the traction surface, the automobile being equally brought to a standstill by the action of the rollers 6 and the friction cones and collars. Rearward movement of arm 1 beyond vertical position is positively limited by a stop element 1ᵇ provided at the upper end of a reinforcing rib 1ª formed on the rearward face of arm 1, element 1ᵇ being disposed to contact with plate 3 when arm 1 is in vertical position.

If desired, any other suitable or preferred means may be provided for rocking shaft 20 for raising arms 1 and the parts associated therewith, though I prefer to employ the shaft 29 and associated parts for this purpose. As will be understood, and as indicated herein, changes may be made in details of construction and arrangement of parts of the invention without departing from the field and scope of the same, and I intend to include all such variations, as fall within the scope of the appended claims, in this application in which the preferred form only of my invention is disclosed.

What I claim is:

1. In combination with an automobile, braking members pivotally mounted at their rearward ends and extending when in normal raised position forwardly of the rear axles, and means for normally holding said members raised, said means permitting limited vertical movement of the members and positively limiting downward movement thereof, the braking members and the means for holding the same raised being so related that the force of a blow struck by the members on their downward movement will be transmitted along a line which will intersect the traction surface slightly in advance of a vertical line passing through the axis of the axles of the automobile.

2. In combination with an automobile, supporting arms pivotally connected at their rearward ends to the automobile adjacent to the rear axle housings thereof, weight members carried by said arms at the forward ends thereof, adjusting arms rockably mounted in advance of the weight members, means for operating said arms, rods pivoted at their lower ends to the forward ends of said supporting arms, and slotted heads secured on the upper ends of said rods, said adjusting arms being provided with elements projecting through said slots.

3. In combination with a member to be raised and lowered, a casing, a drum rotatably mounted in the casing, a cable connecting said member and the drum, a worm wheel secured to the drum, a member rockably mounted in the casing for movement about an axis parallel with the axis of the drum and wheel, a shaft rotatably mounted in said member and provided with a worm, and a wedge member operating between one wall of the casing and the shaft and acting to hold the shaft in operative position with the worm in mesh with said worm wheel, and means for withdrawing the wedge member to permit movement of the shaft away from the worm wheel and disengage the worm from said wheel.

4. In combination with an automobile, supporting arms pivotally connected at their rearward ends to the automobile adjacent to the rear axle housing thereof, said arms being provided at their forward ends with supporting frames, shafts secured through said frames, friction cones mounted on said shafts and adjustable longitudinally thereof, said cones being held against rotation, cylinders extending about said shafts, friction collars secured in the cylinders and positioned to contact with the cones, and means for forcing said cones into contact with the collars.

5. In combination with an automobile, supporting arms pivotally connected at their rearward ends to the automobile adjacent to the rear axle housing thereof, said arms being provided at their forward ends with supporting frames, shafts secured through said frames, friction cones mounted on said shafts and adjustable longitudinally thereof, said cones being held against rotation and tapering toward each other, friction collars positioned to contact with the cones, a cylinder fitting about the shafts between the cones, said collars being secured in the ends of the cylinder, and means for forcing the cones toward each other into tight contact with said collars.

In testimony whereof I affix my signature.

FRANK W. HANLEY.